Nov. 19, 1957   R. F. LESTER   2,813,970
LIGHTING UNIT
Filed Dec. 20, 1954
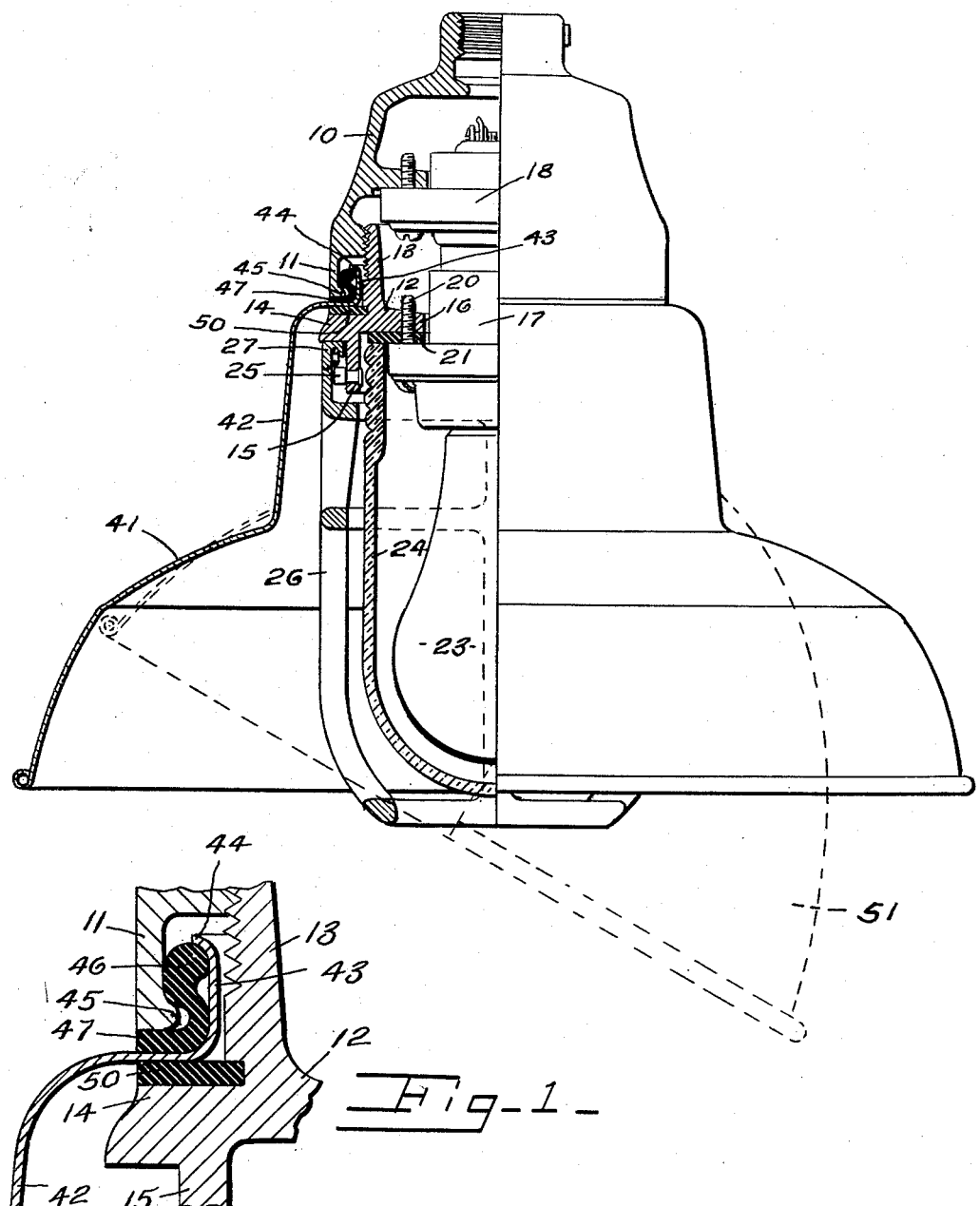
Fig-1-
Fig-2-
INVENTOR.
Ray F. Lester
BY
D. Emmett Thompson
ATTORNEY.

Patented Nov. 19, 1957

2,813,970

LIGHTING UNIT

Ray F. Lester, Syracuse, N. Y., assignor to Crouse-Hinds Company, Syracuse, N. Y., a corporation of New York Application December 20, 1954, Serial No. 476,153

4 Claims. (Cl. 240—11.2)

This invention relates to lighting units and more particularly to industrial lighting units of the vapor proof type.

The invention has as an object a lighting unit comprising a body or canopy portion for attachment to an electrical conduit line and having a receptacle globe and guard assembly removable from the canopy portion as a unit and having a shade detachably secured to the canopy by a resilient sealing member.

The invention consists in the novel features and in the combinations and constructions hereinafter set forth and claimed.

In describing this invention, reference is had to the accompanying drawings in which like characters designate corresponding parts in all the views.

In the drawings—

Figure 1 is an elevational view, partly in vertical section, of a lighting unit embodying my invention.

Figure 2 is an enlarged sectional view of the upper portion of the shade, the shade sealing members and contiguous portion of the lighting unit, this structure being shown in the upper left portion of Figure 1.

The unit consists of a body or canopy 10 formed with an internally threaded surface and having a depending cylindrical flange 11. A supporting member 12 is provided with an upwardly extending cylindrical flange 13 threading into the canopy 10, see Figures 1 and 2. The support 12 is formed with a radial flange 14 extending outwardly in confronting relation to the cylindrical flange 11 of the canopy and also a depending cylindrical flange 15 spaced inwardly from the periphery of the flange 14. The support 12 is also formed with a second radial flange 16 extending inwardly and to which is attached the lamp receptacle 17.

A contact supporting block 18 is mounted in the canopy 10 above the lamp receptacle 17, and these members have complemental contacts engageable when the support 12 is threaded into the canopy.

The receptacle 17 is secured to the flange 16, as by screws 20, and a sealing gasket 21 is interposed between the flange of the receptacle 17 and the flange 16, see Figure 1.

The lamp 23 is enclosed by a glass globe 24, the upper end of which is threaded into the flange 15 as is customary in lighting units of this type. The gasket 21 is also engaged by the upper end edge of the globe to provide a seal for the interior of the unit. A pair of shouldered pins 25 are fixedly mounted in the flange 15 in diametrically opposed relation for supporting a metallic guard 26. The guard 26 is formed at its upper end with an annular portion 27 formed on its inner surface and provided with means to engage pins 25.

The unit is provided with a shade 41 having an upwardly extending substantially cylindrical portion 42, the upper end of which extends inwardly between the flanges 11 and 14 and thence upwardly in cylindrical formation, as at 43, between the flanges 11, 13, and the upper end edge of the flange portion 43 is crimped outwardly as at 44. The arrangement is such that there is an appreciable annular space between the inner surface of the canopy flange 11 and the flange 43 of the shade. In this space, there is positioned a gasket of yieldable material, such as rubber. The flange 11 is formed on its inner surface adjacent the lower edge thereof with an internal bead 45.

The shade gasket is formed with an upper portion 46 of radial thickness complemental to the space between the flanges 11, 13. The lower portion of the gasket is of less thickness and curves outwardly between the shade and the lower edge of the flange 11. This lower portion 47 of the gasket is of less thickness than the spacing between the bead 45 and the shade flange 43, the formation being such that the curved part of the gasket portion 47 snugly engages the outer surface of said flange 43 but is spaced inwardly from the bead 45.

With this arrangement, the shade is yieldingly affixed to the canopy, it being supported by the upper portion 46 of the gasket due to the out-turned portion 44 of the shade and the gasket being seated upon the bead 45. In other words, upon removal of the receptacle globe and guard support 12 from the canopy, the shade remains adequately affixed to the canopy. Preferably, a gasket 50 is positioned between the flange 14 and the shade whereby the shade is yieldingly supported when the unit is in use whereby if the shade is accidentally struck, as by a ladder or other moving object, the shade is free to move to a limited extent, thereby minimizing injury to the shade and to the unit under such circumstances. Upon removal of the support 12 from the canopy, the shade can be readily detached from the canopy by manually moving it in angular relation to the axis of the unit. The lower portion of the shade may be formed to direct the light in angular relation to the axis of the fitting, as indicated by dotted outline 51, Figure 1.

What I claim is:

1. A lighting unit comprising a canopy having an internally threaded surface and a cylindrical flange depending therefrom, said flange being formed at its lower edge with an internal bead, a globe, guard, and receptacle support having a radial flange overlying the lower edge of said cylindrical flange, said support being also formed with a cylindrical flange depending from said radial flange and having a second cylindrical flange spaced inwardly from the periphery of said radial flange and extending upwardly therefrom in concentric spaced relation to said cylindrical flange on said canopy and threading therein, a shade formed at its upper end with a flange extending inwardly between the lower edge of the cylindrical flange on the canopy and the radial flange on said support and upwardly between the cylindrical flange on the canopy and the upper cylindrical flange on the support, the upper end of said shade flange having an outturned edge portion, an annular gasket of yieldable material positioned between said out-turned portion and said bead on the cylindrical flange of the canopy, said gasket being also positioned between the bead on the cylindrical canopy flange and the intermediate portion of the shade flange for yieldingly supporting the shade in the canopy.

2. A lighting unit comprising a canopy, a lamp receptacle carried by the canopy, said canopy being formed with a depending cylindrical flange formed with an internal bead at its lower edge, a shade formed at its upper end with a radial flange extending inwardly in spaced relation to the lower edge of the canopy flange and having an upwardly extending cylindrical portion positioned within said canopy flange in concentrically spaced relation thereto, and said cylindrical portion of the shade being turned outwardly at its upper edge, a gasket of yieldable material having an upper portion of radial thickness comparable to the space between the cylindrical flanges of the canopy and shade, said gasket being formed with a lower portion of less thickness extending downwardly in spaced relation to said bead and radially outwardly between the lower edge of the canopy flange and the radial flange of the shade, the upper thickened portion of said gasket engaging said bead and the inturned end portion of said flange.

3. A lighting unit comprising a canopy, a lamp receptacle carried by the canopy, said canopy being formed with a depending cylindrical flange formed with an internal bead at its lower edge, a shade formed at its upper end with a radial flange extending inwardly in spaced relation to the lower edge of the canopy flange and having an upwardly extending cylindrical portion positioned within said canopy flange in concentrically spaced relation thereto, and said cylindrical portion of the shade being turned outwardly at its upper edge, a gasket of yieldable material positioned between the shade and the lower edge of the canopy flange, said gasket being of thickness less than the space between the cylindrical shade flange and said bead, said gasket extending upwardly in engagement with the cylindrical shade flange and being formed with a thickened upper portion positioned above said bead and filling the space between said cylindrical flanges and said thickened portion being formed with a circumferentially extending groove on its inner surface.

4. A lighting unit comprising a canopy, a lamp receptacle carried by the canopy, said canopy being formed with a depending cylindrical flange formed with an internal bead at its lower edge, a shade formed at its upper end with a radial flange extending inwardly in spaced relation to the lower edge of the canopy flange and having an upwardly extending cylindrical portion positioned within said canopy flange in concentrically spaced relation thereto, and said cylindrical portion of the shade being turned outwardly at its upper edge, a gasket formed of yieldable material and having an upper portion of radial thickness comparable to the space between the cylindrical flanges of the canopy and shade, said gasket being formed with a lower portion of less thickness extending downwardly in spaced relation to said bead and radially outwardly between the lower edge of the canopy flange and the radial flange of the holder.

References Cited in the file of this patent

UNITED STATES PATENTS

| | | |
|---|---|---|
| 1,432,026 | Horne | Oct. 17, 1922 |
| 1,710,281 | Wilcke | Apr. 23, 1929 |
| 1,754,931 | Brachtl | Apr. 15, 1930 |
| 1,808,501 | Lang | June 2, 1931 |
| 1,943,852 | Anderson | Jan. 16, 1934 |
| 2,267,208 | McKay | Dec. 23, 1941 |
| 2,749,433 | Appleton | June 5, 1956 |
| 2,753,446 | Lester | July 3, 1956 |

FOREIGN PATENTS

| | | |
|---|---|---|
| 492,075 | Great Britain | Sept. 14, 1938 |